US006905286B2

(12) United States Patent
Masui et al.

(10) Patent No.: US 6,905,286 B2
(45) Date of Patent: Jun. 14, 2005

(54) POROUS PIPE AND APPARATUS AND METHOD OF PRODUCING THE SAME

(75) Inventors: Hiroyuki Masui, Takatsuki (JP); Tatsuya Machino, Takatsuki (JP); Syoji Hirao, Takatsuki (JP); Akihiro Fujii, Takatsuki (JP); Keiji Nakamata, Takatsuki (JP)

(73) Assignee: Totaku Industries, Inc., Osaka (JP)

( * ) Notice: Subject to any disclaimer, the term of this patent is extended or adjusted under 35 U.S.C. 154(b) by 0 days.

(21) Appl. No.: 10/094,627

(22) Filed: Mar. 12, 2002

(65) Prior Publication Data

US 2002/0124899 A1 Sep. 12, 2002

(30) Foreign Application Priority Data

Mar. 12, 2001 (JP) ........................................ 2001-068412

(51) Int. Cl.$^7$ ................................................ F16L 11/11
(52) U.S. Cl. ........................... 405/49; 405/45; 138/121; 138/173
(58) Field of Search ................................ 138/121, 177, 138/173, 178, DIG. 11, 105, 154; 405/49, 36, 46, 43–45

(56) References Cited

U.S. PATENT DOCUMENTS

| | | | | |
|---|---|---|---|---|
| 3,440,822 A | * | 4/1969 | Hegler | ........................ 405/45 |
| 3,765,535 A | * | 10/1973 | Anderson et al. | ........... 210/274 |
| 3,841,815 A | | 10/1974 | Labarre | |
| 4,471,813 A | * | 9/1984 | Cothran | ....................... 138/122 |
| 4,487,232 A | * | 12/1984 | Kanao | ......................... 138/122 |
| 5,007,462 A | * | 4/1991 | Kanao | ......................... 138/154 |

FOREIGN PATENT DOCUMENTS

| | | |
|---|---|---|
| JP | 52-4675 | 2/1977 |
| JP | 61-93528 | 6/1986 |
| JP | 64-1814 | * 1/1989 |

* cited by examiner

Primary Examiner—Sunil Singh
(74) Attorney, Agent, or Firm—Wenderoth, Lind & Ponack L.L.P.

(57) ABSTRACT

A porous pipe having an excellent absorbing and draining function, a producing apparatus capable of producing a porous pipe at high speed and low cost, and a method of producing a porous pipe are provided. The porous pipe is a pipe formed by spirally winding a tape. The pipe is formed by a hole forming portion 13 for forming a recess or a notch or a hole in the tape 2 molded by a tape molding portion 11, and the hole forming portion 13 is located between the tape molding portion 11 and a pipe forming portion 12 so that the tape 2 is molded, holes 6 are formed, and a pipe 1 is formed continuously. The holes 6 are formed into a predetermined shape by elongating the hole 6 from a side of the pipe forming portion 12. In the pipe 1 formed thereby, a peripheral wall portion of the hole 6 is gradually thin-walled toward an outer peripheral face of the hole.

2 Claims, 9 Drawing Sheets

POROUS PIPE AND APPARATUS AND METHOD OF PRODUCING THE SAME

BACKGROUND OF THE INVENTION

1. Field of the Invention

The present invention relates to a porous pipe preferably used as, for example, a drain pipe for a culvert, and relates to an apparatus for producing the pipe and a method of producing the pipe.

2. Description of the Related Art

A method of forming a number of holes in a pipe wall made of synthetic resin, conventionally, includes perforating a nonporous pipe by moving a drill in a forward and rearward direction or previously producing a perforated tape and forming a pipe by spirally winding the tape during a separate step.

FIG. 13 shows an example of a conventional porous pipe formed by spirally winding a tape. In the drawing, reference number 31 designates a flat tape made of resin and previously aligned with a number of holes 32 in a longitudinal direction. Reference number 33 designates a corrugated tape having a section in a shape of a channel-like groove and integrally provided with connection pieces 34 directed outwardly at both front ends in a cross direction thereof. Further, by overlapping the flat tape 31 and the corrugated tape 33 such that the two end edges of the flat tape 31 overlap the connection pieces 34 of the corrugated tape 33, and by winding both members spirally while melting together or adhering together both members, there is formed a corrugated pipe having the holes 32 at valley portions of an outer periphery thereof.

FIG. 14 shows an enlarged portion of a hole of the porous pipe formed by the conventional method, in which the hole 32 is formed substantially orthogonally to a pipe wall 35, and in which an inner peripheral face of the hole 32 and a surface of the pipe wall 35 are substantially orthogonal to each other. An arrow mark of the drawing designates a flow of water into the hole 32.

In the above-described conventional methods, according to the former method of perforating the nonporous pipe hole-by-hole using the drill, there is a drawback in that there is a limit to the speed of moving the drill and to the perforating speed, that is, production speed of a porous pipe cannot be increased. Further, this method poses a problem of creating a poor operational environment such as producing drilling chips or emitting noise. In addition, this method also poses a problem in that the pipe wall is warped during drilling and, therefore, the strength of the pipe is reduced.

Meanwhile, according to the latter method of forming holes when producing the tape, a special apparatus capable of forming holes is required when forming such a tape. Further, production of the tape and forming of the pipe are carried out by separate steps. Therefore, there is a problem in that the number of steps is increased and production cost is increased. Further, a place for storing the tape before being employed in a pipe forming machine is needed, and control therefore is also needed.

In addition, according to the corrugated porous pipe formed by being wound spirally, as shown by FIG. 13, the end edge of the perforated tape 31 overlaps the tape 33 on the other side, and the tape portions are melted together or adhered together. Therefore, there is a drawback in that a portion of the perforated tape 31 is restricted by an amount of the overlapped portion, the porosity cannot be increased, and an absorbing or draining function is deteriorated by that amount.

Further, as shown in FIG. 14, according to the conventional porous pipe, the surface of the pipe wall 35 surrounding the hole 32 is made substantially orthogonal to a peripheral wall of the hole 32. Therefore, when the porous pipe is used for a drain pipe of a culvert or the like, there is a case in which water does not necessarily flow smoothly to the hole 32, and the absorbing function is not sufficient.

SUMMARY OF THE INVENTION

It is an object of the invention to provide a porous pipe excellent in an absorbing and draining function, an apparatus for producing a porous pipe, and a method of producing a porous pipe capable of producing a porous pipe at high speed and low cost by resolving the drawbacks of the conventional porous pipe and the method of producing the same.

It is another object of the invention to provide a porous pipe in which a pipe wall surrounding a hole is gradually thin-walled toward the hole and a surface of the surrounding wall is gradually inclined to thereby provide a porous pipe having a better feeding and draining function than that of a conventional porous pipe in which a pipe wall is substantially orthogonal to a peripheral wall of a hole.

It is another object of the invention to provide a porous pipe in which, in a corrugated pipe formed by spirally winding a tape, a hole is provided at a center piece portion of the tape having a substantially channel-like section by melting or adhering together a preceding tape and a succeeding tape at an outer side portion of the center piece in the width direction. Thus, it is not necessary to provide an overlapping margin for melting together or adhering together the tapes at the center piece. Therefore, the diameter of the hole can be enlarged to a full width of the center piece and a porous pipe having a large porosity and which has an excellent feeding and draining function is provided.

It is still another object of the invention to provide an apparatus and a method of producing a porous pipe which has an excellent production efficiency by directly employing a tape molded by a tape molding portion to a pipe forming portion as it is, continuously molding the tape and forming the pipe, and forming a hole between the tape molding portion and the pipe forming portion. That is, according to the invention, there is provided an apparatus for, and a method of producing a porous pipe having a better production efficiency than a method of forming a pipe by newly employing a temporarily perforated tape in a pipe forming machine or the like. Further, there is no necessity for storing the tape before employing the tape in the pipe forming machine or the like, and a space for storing the tape and control of a semiproduct thereof is not needed.

It is still another object of the invention to provide an apparatus and a method of producing a porous pipe without producing drilling chips, with no concern about emitting noise as in a drill and without deteriorating an operational environment since a hole can be formed only by making a recess or a notch in a tape in a state near to a molten state immediately after coming out from a tape forming machine.

It is still another object of the invention to enable high speed formation because a hole can continuously be formed in a moving tape, and a special apparatus for pulling the tape can be eliminated by providing a tension for elongating the tape at that occasion by utilizing the driving force of a pipe forming portion.

It is still another object of the invention to provide an apparatus and a method of producing a porous pipe capable of also easily forming a hole at a side wall portion of a valley portion in a spiral corrugated pipe since the hole is formed at a stage of a tape before forming the pipe. Further, residual stress is prevented even when the pipe is formed by melting together a preceding side and a succeeding side of the same tape even by perforating at the melted portion. Therefore, according to the invention, there can be provided a pipe having a very large porosity formed with holes over a total face thereof in a longitudinal direction without restricting the position of the holes to a mountain portion or a valley portion of the corrugated pipe.

It is still another object of the invention to be able to maintain an absorbing and draining function over a long period of time by perforating a side wall and a top portion of the pipe, although the absorbing and draining function is deteriorated particularly in a drain pipe buried in a culvert or underground since sediments or the like are liable to store at the valley portion to thereby cause clogging.

Objects of the invention other than the above-described objects, and advantages provided thereby, can clearly be understood by the following description explained with reference to specific embodiments.

DETAILED DESCRIPTION OF THE INVENTION

Figure 1:
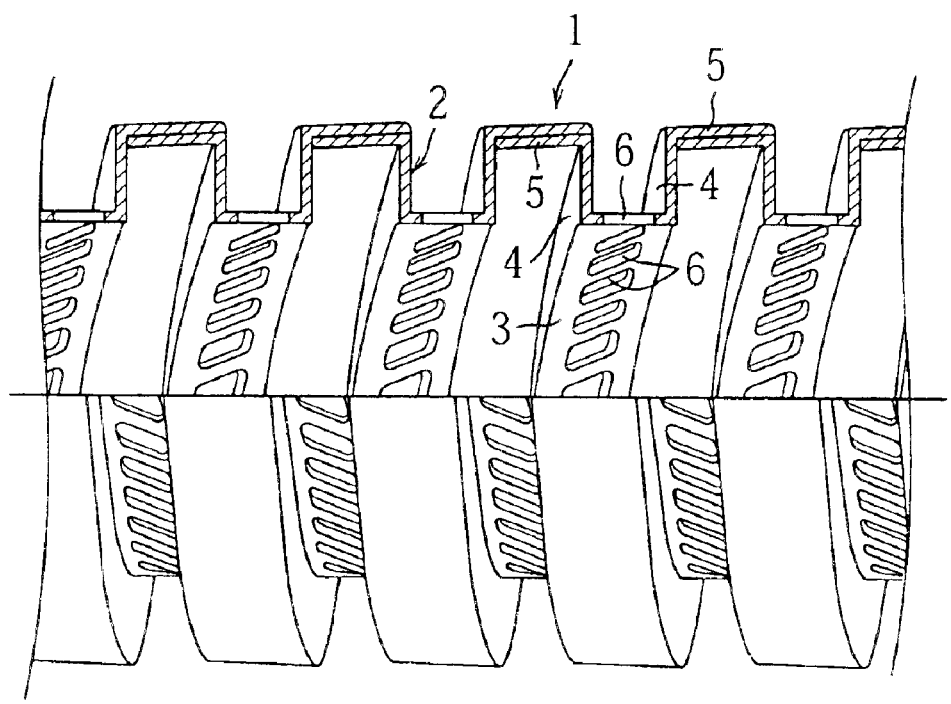
FIG. 1 is a partial sectional vertical view of a porous pipe according to an embodiment of the invention.

An explanation will be given of an embodiment as follows when the invention is embodied in a spiral corrugated pipe. FIG. 1 shows an example of a spiral corrugated pipe 1 provided in accordance with the invention and is formed by spirally winding a single piece of a resin tape 2. As a material of the resin tape 2, there are various conceivable kinds of material that can be used, such as polyethylene resin, vinyl chloride resin and the like.

The resin tape 2 has a corrugated shape having a channel-like section comprising a center piece 3 and a pair of side pieces 4, 4 integrally provided at both sides of the center piece 3 and arranges so as to extend from the center piece 3 in orthogonal outer directions (i.e., in an outward radial direction orthogonal to the center piece 3). A pair of connection pieces 5, 5 projecting orthogonally in outer directions (i.e., in an outward axial direction orthogonal to the side pieces 4, 4) are integrally provided at front ends in the width direction of the respective side pieces 4, 4 along a longitudinal (axial) direction of the pipe. Further, the center piece 3 is formed with a number of holes 6 in one row along the longitudinal direction of the tape 2 (the circumferential direction of pipe 1). The holes 6 can also be formed in two or more rows.

By spirally winding the resin tape 2 with the above-described constitution such that the center piece 3 is disposed on an inner side with respect to a circumference of the pipe 1, the spiral corrugated pipe 1 having a corrugation with respect to the longitudinal direction is formed. In that case, the connection piece 5 on a longitudinal front side with respect to the pipe 1 and the connection piece 5 on a longitudinal rear side with respect to the pipe 1, are overlapped by each other and melted together or adhered together to thereby become integrated.

Although in FIG. 1, the entire widths of the connection pieces 5, 5 are overlapped, the connection pieces 5, 5 may be partially overlapped in a possible range. Alternatively, it is also possible to interpose other connection tape between the connection pieces 5, 5, and the other connection tape and the connection pieces 5 are melted together or adhered together without overlapping the connection pieces 5. It is also conceivable to melt together or adhere together another connection tape and the side piece 4 without providing the connection piece 5.

Figure 13:
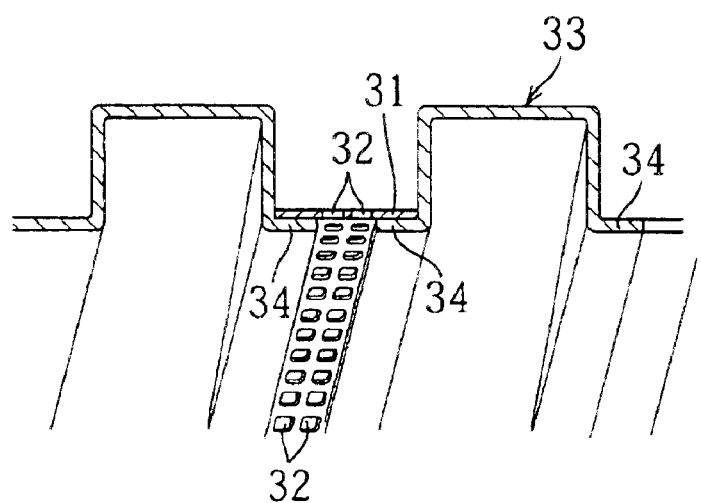
FIG. 13 is a sectional view of a convention porous pipe.
Figure 14:
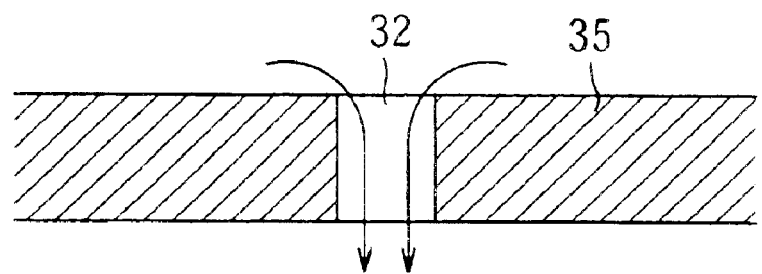
FIG. 14 is an enlarged sectional view of a portion of a porous pipe formed by a conventional method.

The corrugated pipe 1 constituted as described above, includes a number of holes 6 at a bottom portion of a "valley" (groove) of an outer periphery of the pipe 1, and the valley is formed by the tape center piece 3. In this case, the preceding (front) side and the succeeding (rear) side of the spiral portion (with respect to the longitudinal axis of pipe 1) are melted together or adhered together at portions of the connection pieces 5, 5, which are not provided with the holes 6. Therefore, it is not necessary to provide an overlap margin at the center piece 3, and the holes 6 can be formed over the full width of the center piece 3. Thus, the porosity can be increased twice or more as compared to that of the conventional example of FIG. 13. When a representative example is shown, according to the conventional example of FIG. 13, there is provided a constitution having a porosity of only about 5%. However, according to the constitution of the present embodiment, the porosity can be increased to 10% or more.

Further, as a modified example of the pipe 1 of FIG. 1, it is conceivable to form the pipe 1 so that the center piece 3 is wound to constitute an outer side thereof, and the holes 6 are provided at a top face of a "mountain" portion (ridge) of the outer periphery.

Figure 2:
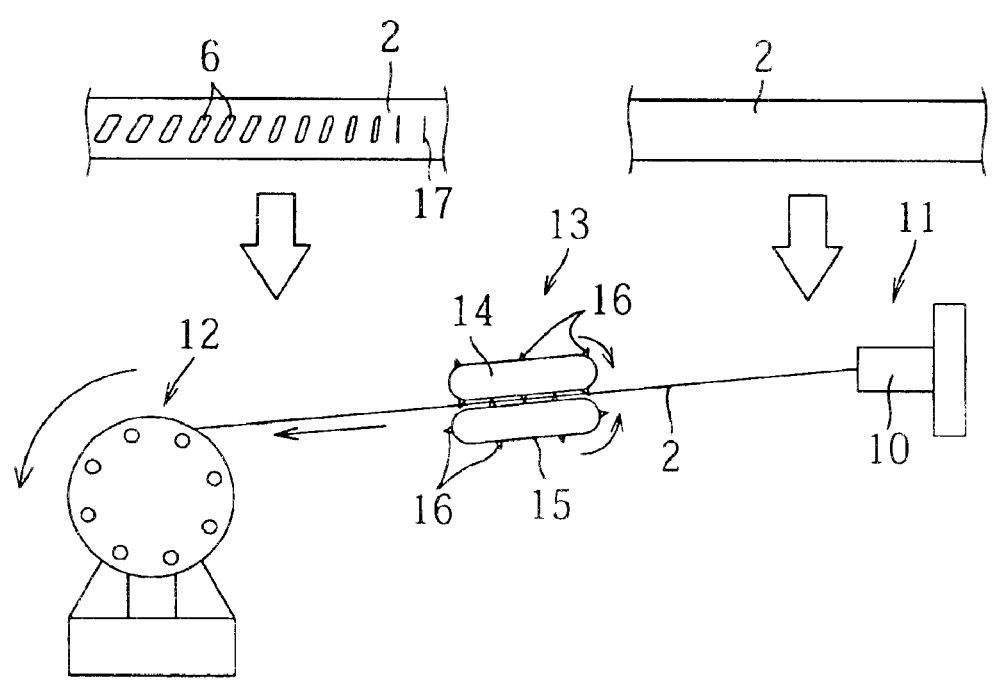
FIG. 2 is a schematic view of an apparatus for producing the same porous pipe.

FIG. 2 shows a schematic view of a producing apparatus for producing the above-described porous pipe 1. In the drawing, reference number 11 designates a tape molding machine for molding the resin tape 2. Specifically, by extruding a resin in a molten state through a molding die 10, the tape 2 having a predetermined sectional shape and, more specifically, the channel-like section having the connection piece 5 is continuously molded.

Notation 12 designates a pipe forming machine for forming the pipe 1 by spirally winding the tape 2. For example, the pipe forming machine is provided with a rotating mandrel, not illustrated, and the pipe 1 is formed by winding the tape 2 around the mandrel and rotating the mandrel while feeding the tape 2 in an axial direction.

Further, the tape 2 immediately after having been molded and extruded from the tape molding apparatus 11, is transferred to the pipe forming machine 12, so that, molding of the tape 2 and forming of the pipe 1 are continuously carried out.

In continuously forming the pipe 1, a perforating machine 13 for perforating the tape 2 at a stage before forming the pipe is arranged between the tape molding machine 11 and the pipe forming machine 12. The perforating machine 13 can include a pair of circumferentially moving endless members 14 and 15 arranged at opposing sides of the tape 2, as shown in FIG. 2. There are formed a number of projecting portions 16 for making recesses or notches 17 having a predetermined depth or for forming holes having a predetermined shape in the surface of the tape 2 at outer peripheral faces of the endless members 14 and 15 at intervals along the circumferential direction.

According to the constitution of the above-described perforating machine 13, when the endless members 14 and 15 are circumferentially moved in a moving direction of the tape 2 by pertinent driving means in synchronism therewith, the notches 17 are formed at pitch intervals of the projected portions 16 by combining the two endless members 14 and 15. By retarding the peripheral speed of the endless members 14 and 15 relative to the winding speed of the pipe forming machine 12, a driving force of the pipe forming machine 12 is exerted on the tape 2 between the endless members 14 and 15 and the pipe forming machine 12. The tape 2 is gradually elongated in the longitudinal direction by the tension and, therefore, the recess or the notch 17 is successively enlarged in the longitudinal direction of the tape to thereby constitute the hole 6 in a predetermined shape. An enlarged surface of the tape 2 at a portion designated by a white arrow mark is shown at the upper side of FIG. 2.

Although, as shown by the drawing, the hole 6 is gradually inclined skewedly because the tension exerted on the tape 2 differs between the left and right sides, it is conceivable to previously cut the notch 17 inversely skewedly so as to anticipate the inclination. Alternatively, it is conceivable to prevent the hole 6 from being inclined by pertinently setting the tension.

At any rate, the shape of the hole 6 is not limited to such a shape, and can be variously modified by changing the means for forming the notch 17 (for example, by changing the shape of the projecting portion 16). Further, the projecting portion 16 may have an edge-like shape or a rod-like shape as long as the above-described recess, notch 17, or the hole can be formed.

Further, as described later, as a result of the elongation, the surrounding area of the hole 6 is gradually thin-walled and the pipe wall at the surrounding area of the hole 6 becomes a shape which is most preferable for the absorbing and draining function.

The driving force of the endless members 14 and 15 can be outputted from the side of the pipe forming machine 12. In addition, normally, the peripheral speed of the endless members 14 and 15 may be lower than the winding speed of the pipe forming machine 12.

It is not necessary that the recess or the notch 17 or the like be pierced to the rear side of the tape 2 as described above. For example, even when the rear side of the hole is closed, the hole is opened by the above-described elongation and becomes the hole 6 pierced to the rear side. Naturally, it is conceivable that the hole 6 pierced to the rear side is formed by the endless members 14 and 15 from the start and the hole is enlarged in the longitudinal direction to have a predetermined shape by the above-described pulling operation. Alternatively, it is also conceivable that the hole 6 having a predetermined shape is formed from the start and the hole 6 is pulled to a degree so as not to be crushed or deformed by the viscoelasticity of the tape 2 near to a molten state.

Further, the pitch of forming the holes 6 can be changed by changing the interval between the projected portions 16, 16. Or, by forming the projected portion 16 only at portions of circumferences of the endless members 14 and 15, the holes 6 can be provided only at portions in the circumferential direction of the pipe 1.

Further, means for forming the recess or the notch 17 or the hole 6 is not limited to the above-described endless members. For example, the means can be a punch reciprocating relative to the face of the tape 2.

Figure 3:
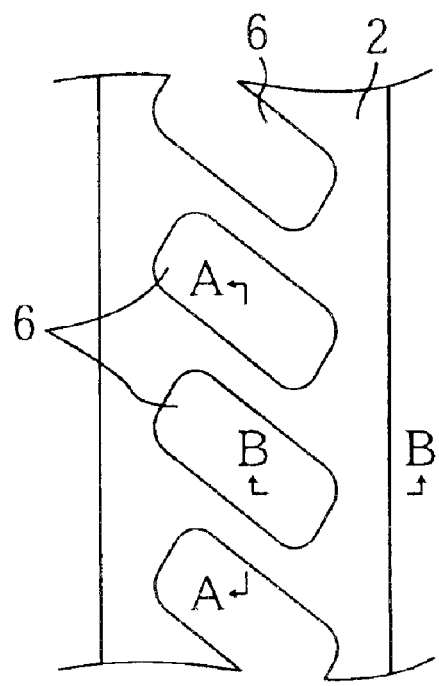
FIG. 3 is a plan view of a portion of a tape after enlarging holes therein.
Figure 4:
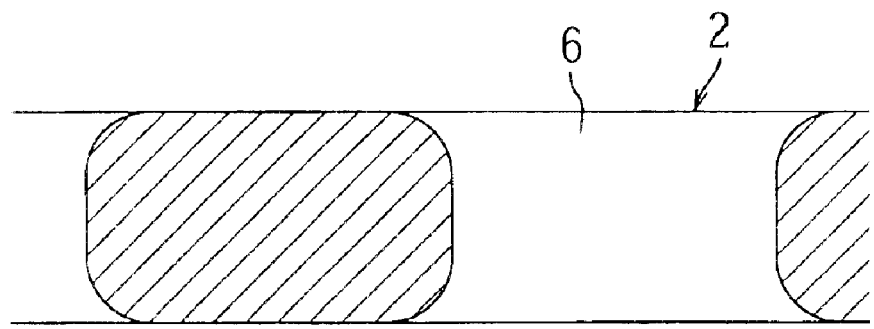
FIG. 4 is an enlarged sectional view of an essential portion of the tape taken along a line A—A of FIG. 3.
Figure 5:
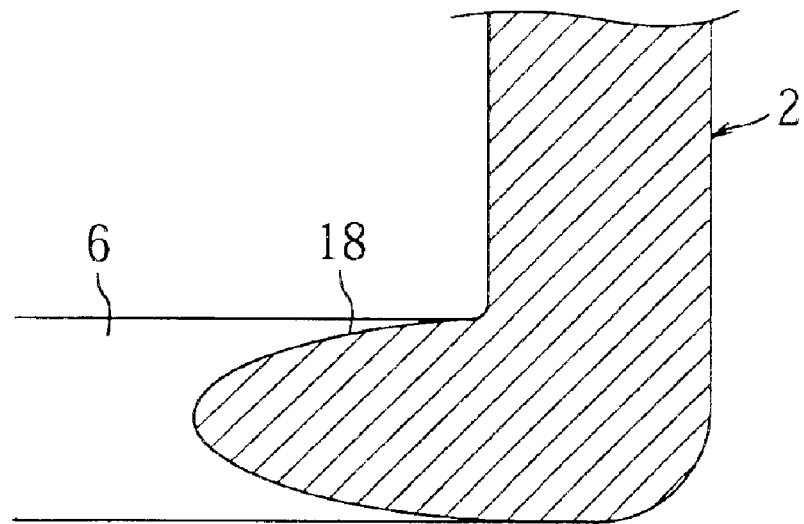
FIG. 5 is an enlarged sectional view of the same essential portion of the tape taken along a line B—B of FIG. 3.

FIG. 3 is an enlarged view of a portion of the hole 6 at a surface of the tape 2 formed as described above. According to the embodiment, the substantially rectangular hole 6 is inclined slightly in the longitudinal direction of the tape because the tension exerted from the pipe forming machine 12 on the tape 2 differs between the left side and the right side. FIG. 4 is an enlarged view of a section taken along a line A—A of FIG. 3 extending in a longitudinal direction of the tape, and FIG. 5 is an enlarged view of a section taken along a line B—B of FIG. 3 extending in the widthwise direction of the tape. As is understood from the drawings, along the longitudinal direction, the inner peripheral face of the hole 6 is constituted by an arc-like shape slightly bulging toward the center of the tape 6 in the thickness direction as shown in FIG. 4. On the other hand, along the width direction, the wall thickness at the surrounding area of the hole 6 is gradually thinned toward the inner peripheral face of the hole 6, so that the surface 18 at the surrounding area of the hole 6 is gradually inclined while forming an arc.

Figure 6:
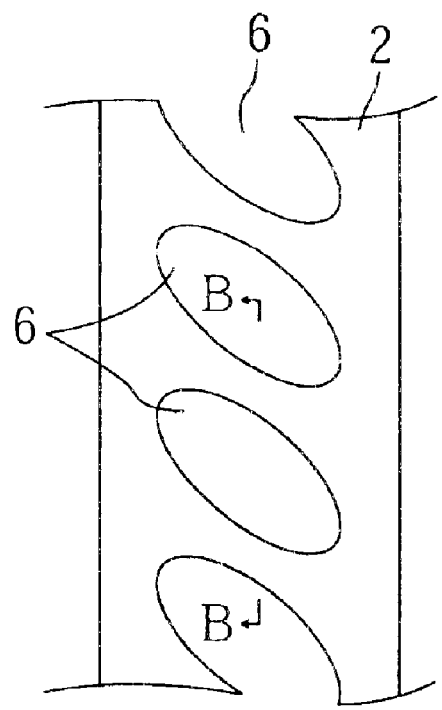
FIG. 6 is a plan view of a portion of the tape having a hole enlarged in an elliptic shape.
Figure 7:
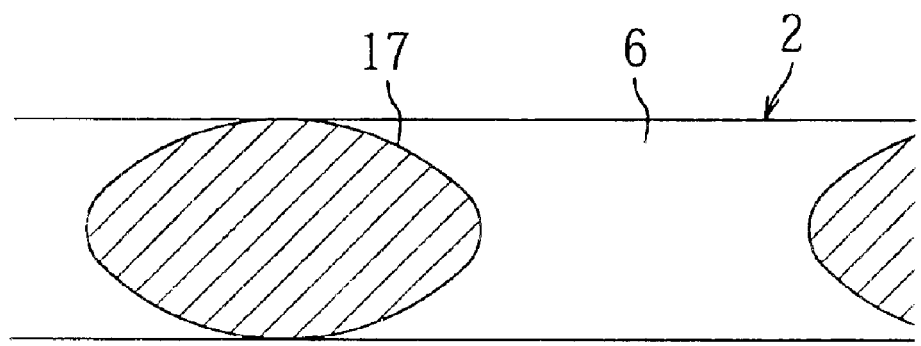
FIG. 7 is an enlarged sectional view of an essential portion of the tape taken along a line B—B of FIG. 6.

FIG. 6 is an enlarged view of a portion of the hole 6 when the hole 6 having an elliptical shape is formed, and FIG. 7 is an enlarged view of a section taken along a line B—B of FIG. 6. As shown by the drawing, in the case of portions of tape 2 between holes 6 having an elliptical cross-section, the wall thickness of the area surrounding the hole 6 is gradually thinned toward the inner peripheral face of the hole 6 over the total periphery of the hole 6, and a surface 17 surrounding the hole is gradually inclined while forming an arc. Such a gradual inclination can be controlled by pertinently setting the shape of the hole 6 and the tension from the side of the pipe forming machine 12.

Figure 8:
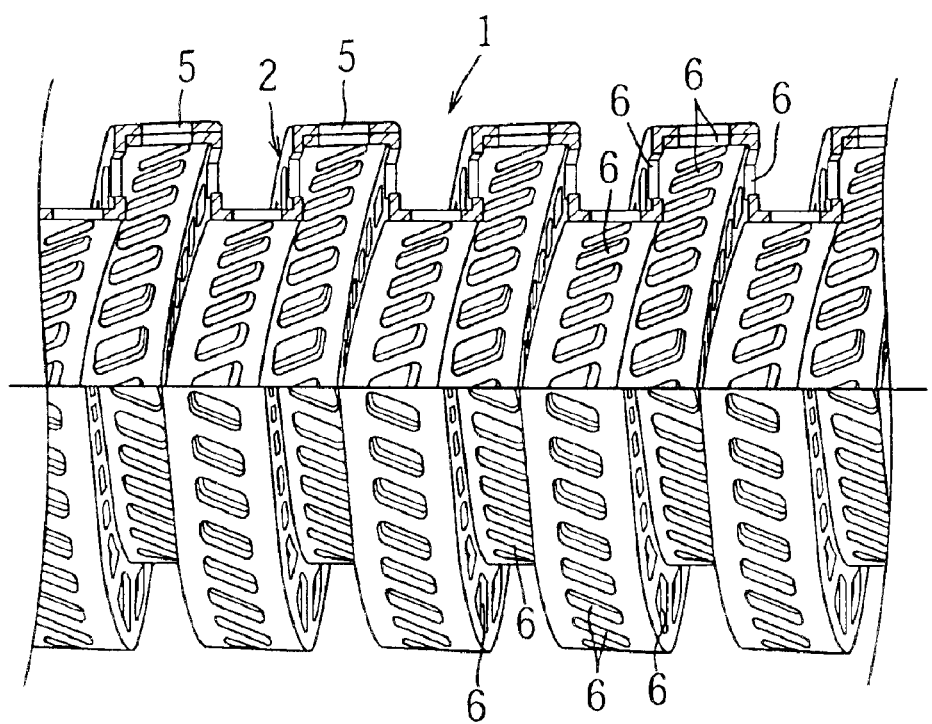
FIG. 8 is a partial vertical sectional view of a porous pipe showing another embodiment of the invention.

FIG. 8 shows another embodiment of the invention. According to this embodiment, in the spiral corrugated pipe 1 the same as that of FIG. 1, the holes 6 are formed not only at the center piece 3 at the recessed bottom (groove) portion of the outer periphery, but also at the side piece 4 constituting the side wall of the recessed portion and at the top of the mountain (ridge) portion.

Particularly, according to this embodiment, the holes are formed at the stage of the tape 2 before forming the pipe as described above and, therefore, the holes 6 can easily be formed at the portion of the side piece 4. Further, according to the embodiment, the top of the mountain (ridge) portions are melted together or adhered together. In particular, in the case of melting together the portions, when the hole is formed by a drill after the portions are melted together as in the conventional example, there is a concern that the strength is reduced by causing residual stress. However, according to the invention, the hole is formed in a state before melting together the portions near to a molten state and, therefore, residual stress is not created and the strength is not reduced. Therefore, the holes 6 can be formed substantially over the total face in the longitudinal direction of the pipe.

Figure 9:
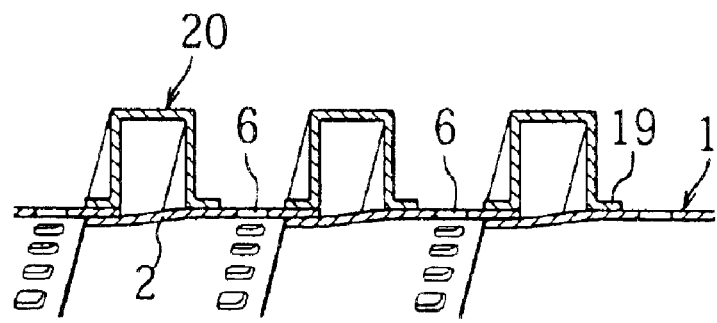
FIG. 9 is an enlarged sectional view of an essential portion of a pipe showing other embodiment of the invention.

FIG. 9 and the drawings successive thereto show other embodiments of the porous pipe 1 according to the invention. In FIG. 9, the holes 6 are formed in the flat tape 2, instead of in the tape 2 having the channel-like section as described above. The flat tape 2 is spirally wound similar to the above-described embodiment, and in the winding operation, a first side of a first edge of a spiral portion and a second side (opposite the first side) of a second edge (opposite the first edge) of a spiral portion are overlapped and melted together or adhered together. In other words, the tape 2 is spirally wound in an edge-to-edge manner so as to form a main pipe portion. Further, an outer periphery of the pipe 1 formed by the flat tape 2 is wound with another outer side tape (a second tape) 20 having a channel-like section and having lips (flange) 19 at both ends thereof in the width direction while melting or adhering the lips 19 together with an outer peripheral face of the pipe 1 such that a portion of a channel-like groove is directed inwardly to thereby constitute a reinforcement. At this occasion, the flat tape 2 is wound to have a pitch larger than the width of the outer side tape 20 such that the holes 6 of the pipe 1 are not closed by the outer side tape 20.

Figure 10:
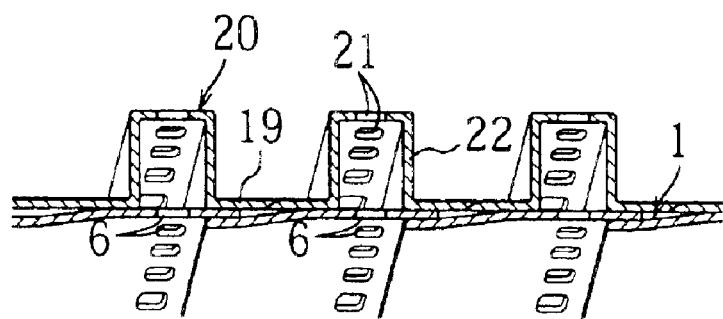
FIG. 10 is a sectional view enlarging an essential portion of a pipe showing another embodiment of the invention.

FIG. 10 shows a composite pipe including the flat tape 2 and the outer side tape 20 having the channel-like section similar to them embodiment of FIG. 9. According to the composite pipe, a hole 21 is also formed at the top of the mountain (ridge) portion formed by the outer side tape 20, and the holes 6 of the tape 2 and the holes of the outer side tape 20 communicate with each other via the groove (channel) portion of the outer side tape 20. In the outer side tape 20, the lip 19 is melted or adhered to the outer peripheral face of the tape 2 on the inner side, at the same time, an end face of the lip 19 is skewedly cut and in the winding operation, a preceding side of the lip and a succeeding side of the lip are melted together or adhered together. Further, the holes 21 of the outer side tape 20 may be formed at a side piece 22 in place of the top portion or may be formed at both the top portion and the side piece.

Figure 11:
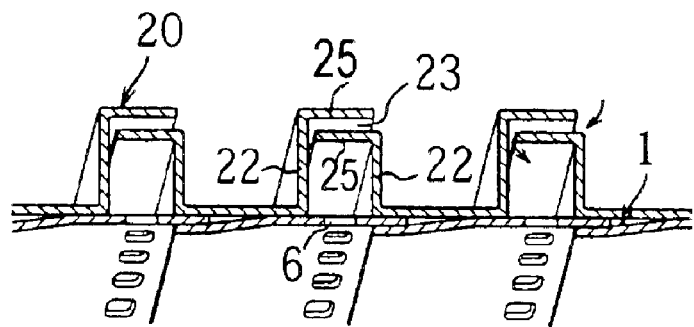
FIG. 11 is an enlarged sectional view of an essential portion of a pipe showing still another embodiment of the invention.

A pipe of FIG. 11 is formed by winding the outer side tape 20 having the channel-like section on an outer side of the tape 2 of the invention. Further, the outer side tape 20 is melted or adhered together with the outer peripheral face of the tape 2 on the inner side at the top faces of the mountain (ridge) portions such that the channel-like groove portion is disposed on the outer side. In this case, according to the outer side tape 20, the heights of the left and right side pieces 22, 22 of the channel-like portion differ from each other. Therefore, when a preceding side of a tongue piece 25 and a succeeding side of the tongue piece 25 are overlapped in the winding operation, a gap 23 is formed between the tongue pieces 19, 19, and the gap 23 communicates with the hole 6 of the porous pipe 1 on the inner side by passing through the channel-like groove portion.

Either of the above-described embodiments of FIG. 10 and FIG. 11 is constructed by a structure in which a path from outside to the holes 6 of the tape 2 on the inner side is complicated by the outer side tape 20, and sediments are less clogged than a pipe having a simple one-layered structure. The outer side tapes 20 of FIG. 10 and FIG. 11 can be perforated by the method of FIG. 2.

Figure 12:
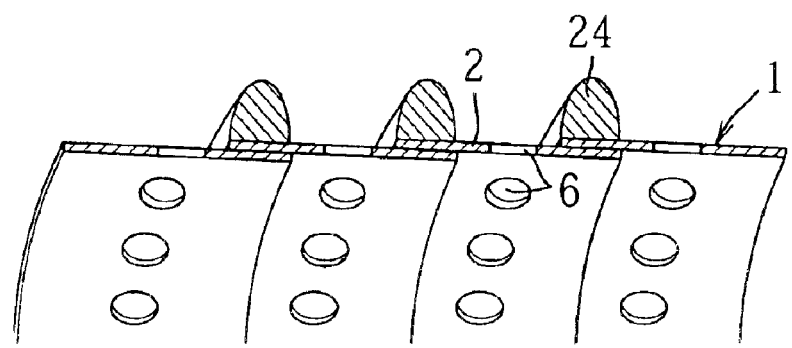
FIG. 12 is an enlarged sectional view of an essential portion of a pipe showing still another embodiment of the invention.

In FIG. 12, in the case of the porous pipe 1 of the invention comprising the flat tape 2, similar to the above-described embodiments, in the winding operation, a preceding side of an end edge of a spiral portion and a succeeding side of an end edge of a spiral portion are overlapped and melted together or adhered together, and a solid reinforcement tape 24 having a section in, for example, a mountain (ridge) shape, is spirally wound along the overlapped portion. The reinforcement tape 24 is, for example, a tape made of hard resin and attached to the outer peripheral face of the tape 2 by melting or adhering a rear face thereof thereto.

The invention is not limited to the above-described embodiments but can variously be modified within the scope of claims, described below and includes the various modifications.

What is claimed is:

1. A porous pipe comprising:
   a spirally corrugated pipe having ridges and grooves alternating along a longitudinal axis of said pipe, a first portion of a plurality of holes being formed in a bottom wall of each of said grooves around a peripheral of said pipe, and a second portion of said holes being formed along at least one of a top wall of each of said ridges and a side wall between said top wall of each of said ridges and said bottom wall of each of said grooves;
   wherein said holes are formed in a pipe wall of said pipe, wherein a thickness of at least a portion of said pipe wall surrounding each of said holes gradually decreases toward a periphery of each of said holes so that a surface of said at least a portion of said pipe wall surrounding said holes is inclined in a direction away from said holes.

2. A porous pipe comprising:
   a pipe wall having a plurality of holes formed therein, wherein a thickness of at least a portion of said pipe wall surrounding each of said holes gradually decreases toward a periphery of each of said holes so that a surface of said at least a portion of said pipe wall surrounding said holes is inclined in a direction away from said holes, said pipe wall including:
   a first tape having a flat cross-section and spirally wound in an edge-to-edge manner so as to form a main pipe portion, said holes including holes formed around a periphery of said main pipe portion; and
   a second tape having a U-shaped cross-section and spirally wound around and attached to an outer surface of said main pipe portion so as to form ridges and grooves alternating along a longitudinal axis of said pipe, wherein said U-shaped second tape has a first side wall, a second side wall, and a center wall connecting said first side wall and said second side wall, said first side wall having a height greater than a height of said second side wall, each of said first side wall and said second side wall having a tongue portion extending therefrom, said second tape being spirally wound around said outer surface of said main pipe portion so that said tongue portion extending from said first side wall overlaps said tongue portion extending from said second side wall so as to form a gap therebetween.

* * * * *